July 18, 1944.  I. P. RODMAN  2,353,763
THRUST BEARING
Filed Dec. 4, 1942  2 Sheets-Sheet 1

INVENTOR
*Isaac P. Rodman*
BY
*Pennie, Davis, Marvin and Edmonds*
ATTORNEYS

July 18, 1944. I. P. RODMAN 2,353,763
THRUST BEARING
Filed Dec. 4, 1942 2 Sheets-Sheet 2
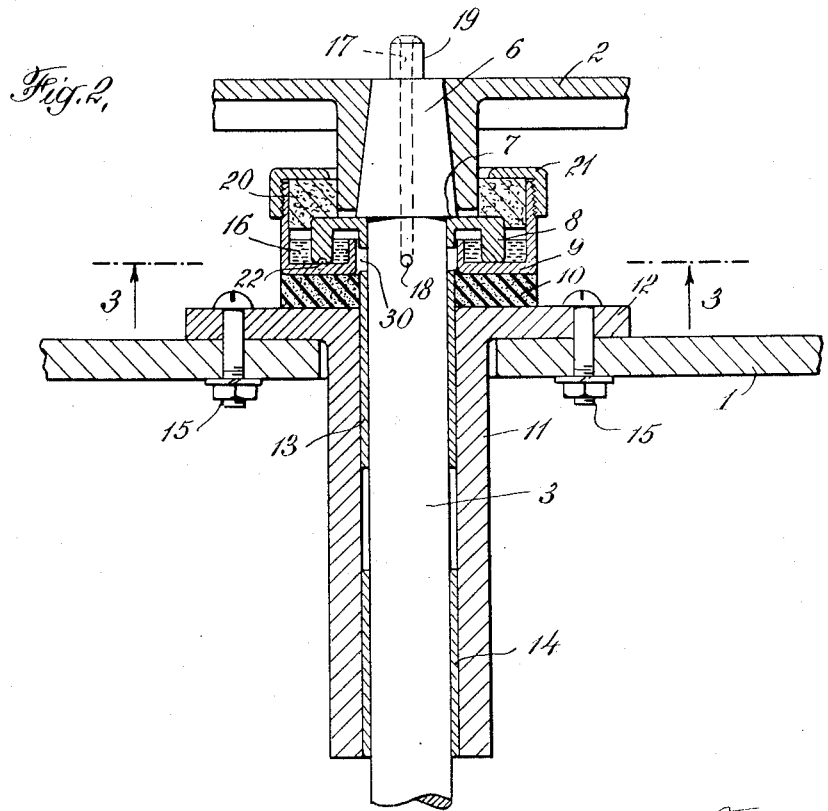
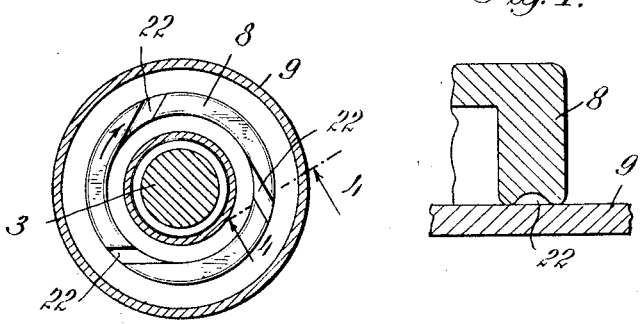
INVENTOR
Isaac P. Rodman
BY
Pennie, Davis, Marvin and Edmonds
ATTORNEYS Patented July 18, 1944

2,353,763

UNITED STATES PATENT OFFICE 2,353,763

THRUST BEARING

Isaac Peace Rodman, Cambridge, Mass., assignor to Columbia Recording Corporation, New York, N. Y., a corporation of Delaware Application December 4, 1942, Serial No. 467,826

7 Claims. (Cl. 308—26)

This invention relates to thrust bearings and especially to those applicable to phonographic turntable shafts.

Thrust bearings are employed generally in mechanical power transmission wherever it is necessary to resist end thrust on a rotating shaft, but few such bearings are satisfactorily applicable to shafts of phonograph recorder and reproducer turntables.

The thrust bearing according to the present invention includes features which are of considerable value not only in connection with phonographic apparatus but also for other purposes wherein it is desired that such a bearing be self-aligning, vibration-damping, readily and thoroughly lubricated, long wearing and simple and cheap to construct.

The bearing of this invention having the foregoing and other advantages which will later be apparent, will now be described in detail with reference to the drawings, wherein:

Fig. 2 is an enlarged view of the bearing shown in Fig. 1;

Fig. 3 is a sectional view taken along the line 3—3 of Fig. 2; and

Fig. 4 is an enlarged sectional view taken along the line 4—4 of Fig. 3 showing a portion, each of the bearing surfaces and an oil groove.

Figure 1:
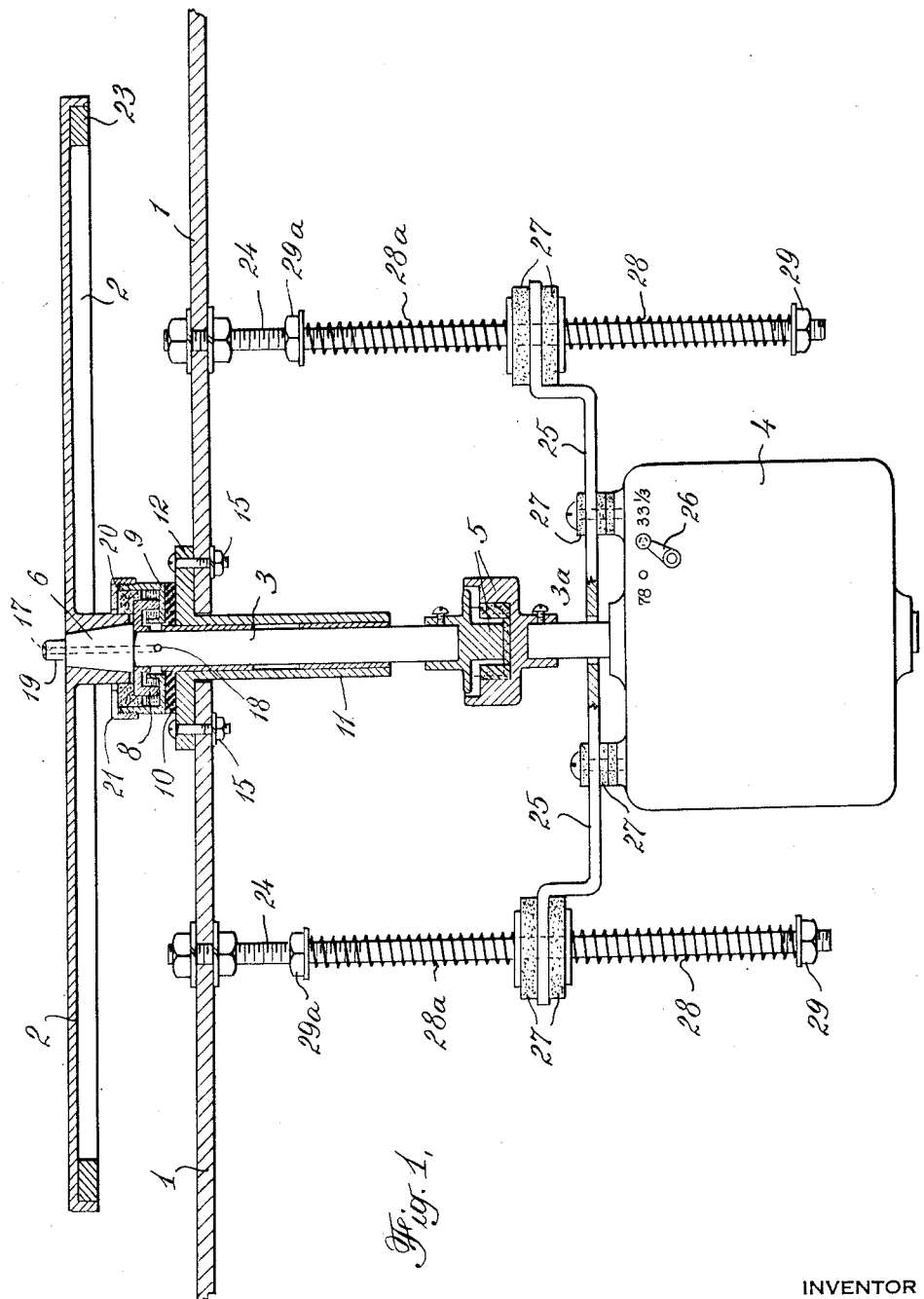
Fig. 1 illustrates a side view, partially in section, of the thrust bearing in accordance with the present invention as applied to a phonographic turntable driving shaft.

In Fig. 1 the thrust bearing of the present invention is shown as employed in connection with a phonographic turntable 2 which is rotated by turntable shaft 3. In this case the bearing transmits the downward thrust on the shaft from the turntable to supporting panel 1.

The construction of the bearing itself can be seen more clearly in the enlarged view, Fig. 2. The bearing proper includes two annular cup-like members 8 and 9 of roughly U-shaped or channel cross-section. The upper member 8 comprising a bearing collar may be made of brass, for example, whereas the lower member 9 comprising a bearing plate may be of steel. In the case of each member the inner rim is shorter than the outer rim, as illustrated.

Turntable shaft 3 is formed with a conical face 6 at its upper end portion. Over conical face 6 the turntable 2, having a complementary conical hole at its center, is placed in frictional engagement. At the bottom side of face 6 a thrust shoulder 7 is formed on the shaft and this shoulder rests upon the top of bearing collar 8, thus transferring the downward thrust of the turntable on the shaft to the bearing collar. The inner rim of this collar is frictionally secured on the shaft with a press fit. The outer rim of bearing collar 8 rests on the inside bottom of the channel of bearing plate 9 and rotates thereon. This outer rim should be thick enough to provide sufficient bearing surface, and therefore is preferably thicker than the inner rim. The bearing surface of plate 9 may be flat. Bearing plate 9 is supported on a thick washer 10 of resilient material such as sponge or other soft rubber, preferably of the oil resistant type, and this washer, in turn, is supported on the top of flange 12 which is integral with bearing-guiding bushing or journal 11. This bushing passes through a suitable hole in panel 1. Flange 12 is secured to panel 1 by machine screws 15 passing therethrough. Upper and lower shaft bearing linings 13 and 14 of brass or other suitable material are provided between rotating shaft 3 and bushing 11. A cylindrical portion, preferably a continuation of the upper bearing lining 13, extends from bushing 11 along the shaft 3 separating washer 10 from the shaft, continuing toward the inner rim of collar 8, but terminating short thereof to form a space 30 around the shaft.

Bearing plate 9 is formed in the shape of an annular channel or cup 16 and this cup is utilized to retain lubricating oil for the bearing which as can be seen, thus runs in an oil bath. In order to fill the channel or oil cup with oil to the proper level an oil duct 17 is drilled vertically through record-centering pin 19 in the upper end of the shaft and down the shaft to a transverse oil hole 18 which communicates through space 30 with the cup. Sufficient oil to lubricate the shaft bearing or journal will work down from space 30. It will be noted that the inside rims of the bearing collar and plate members are spaced apart and overlap, although it is not necessary that they overlap.

Rotation of shaft 3 and of bearing collar 8 tends to throw the oil by centrifugal force from the inside to the outside of the channel of the bearing collar. To compensate for this effect a suitable number (three are shown in Fig. 3) of approximately radial oil grooves 22 are cut across the bearing surface of collar 8. By cutting these grooves at a slight angle so that they diverge outwardly from the true radii in the direction of rotation of the bearing surface the oil is pumped back from the outside to the inside of the bearing collar, and thus the oil is circulated. In order to facilitate the circulation of the oil it is preferable that the edges of the oil grooves and bearing surface of collar 8 be rounded, as shown in Fig. 4. An oil-retaining washer 20 of felt is provided around the top of the cup to furnish an oil seal between the collar and the outer rim of the bearing plate 9, as illustrated in Fig. 2, and this washer is held in place by an annular cap 21 screwed down on suitable threads provided on the outside of the outer rim of the bearing plate. To accommodate the thickness of the washer this outer rim is longer than any of the other three rims of the bearing members.

The purpose of resilient washer 10 is to permit of vertical and angular movement of bearing plate 9 with respect to shaft 3 and panel 1, thus making the thrust bearing self-aligning and vibration-damping. To this end sufficient clearance should be left between the upper end of bearing lining 13 and the inner rim of bearing plate 9, and also between the inner rims of the bearing collar and bearing plate.

Returning now to Fig. 1, the driving motor 4 is hung from and supported on panel 1 by suitable motor hanger rods 24 of which three are provided although only two appear in the drawings. Suitable hanger straps 25 suspend the motor on rods 24 between vibration-absorbing springs 28 and 28a, the tension of which can be adjusted by nuts 29 and 29a which screw along the rod, as shown. In order to insulate the motor vibration as much as possible from the supporting panel 1, it is preferable also to employ vibration insulating washers 27 of suitable material such as felt or soft rubber between the motor and the hanger straps 25 and between the hanger straps 25 and the rods 24. Springs 28 and 28a not only tend to absorb vibration but also assist in causing the entire assembly to be self-aligning. As is usual in connection with phonographic motors, a gear shift or clutch lever 26 is provided to allow rotation of the turntable at either 78 or 33⅓ revolutions per minute, as desired.

Between bearing shaft 3 and motor shaft 3a is interposed a flexible coupling 5 for the double purpose of compensating for any misalignment between the motor shaft 3a and the turntable shaft 3 and for insulating the two shafts against transmission of vibration from one to the other. To this end the coupling is preferably constructed so that the surfaces which transmit rotation of shaft 3a to shaft 3 comprise vibration-absorbing material such as oiled felt.

In assembling the phonographic turntable, bearings, and driving mechanism above described, it is usually sufficient to obtain a static balance of the shaft on a knife edge and to obtain a dynamic balance of the turntable by suitable adjustment of a peripheral weight 23 which preferably should comprise most of the weight of the turntable.

What is claimed is:

1. A thrust bearing assembly including a shaft-guiding bushing, a rotating shaft journalled in said bushing, a flange on said bushing adapted to be secured to a supporting panel, a thick washer of resilient material around said shaft and adjacent the top of said flange, an annular bearing plate of channel section having an inner rim and an outer rim and supported upright by seating on said washer whereby automatically to align said bearing, an annular bearing collar of channel section inverted with respect to the channel section of said plate and having an inner rim and on outer rim, the inner rim of said collar engaging said shaft whereby said collar is rotated, the outer rim of said collar being of greater thickness than the inner rim thereof and terminating in a thrust bearing surface against the inside bottom of the channel of said bearing plate, means on said shaft to transfer thrust from said shaft to said collar, the inner rim of said plate being shorter than the outer rim of said collar, the outer rim of said plate being longer than any of said other three rims and extending above said collar, oil-sealing means positioned between said collar and the outer rim of said plate, and cap means co-operating with the outer rim of said plate to retain said oil-sealing means in position.

2. In a thrust bearing assembly according to claim 1, a cylindrical portion extending from said bushing along the surface of said shaft between said shaft and said washer toward the inner rim of said collar and terminating short thereof to form a space around said shaft through which oil may flow to the channel in said bearing plate, and an oil hole in said shaft communicating with said space.

3. In a thrust bearing assembly, an annular bearing plate member of channel section, and an annular collar member of channel section inverted with respect to said plate member, each said member having an inner rim and an outer rim, the inner rim of said collar member being of smaller diameter than the inner rim of said plate member and the outer rim of said collar member terminating in a thrust bearing surface against the channel of said plate member, means for supplying oil to the channel of said plate member, means for retaining oil in said channel, a shaft secured to the inside of said collar member whereby to rotate the same, oil grooves in the bearing surface of said collar diverging from true radii in the direction of rotation of said collar, means on said shaft transferring thrust to said collar member, a support through which said shaft passes, and resilient thrust-carrying means separating said plate member and said support, whereby said bearing is self-aligning.

4. In a thrust bearing assembly, an annular bearing plate member of channel section and an annular collar member of channel section inverted with respect to said plate member, each said member having an inner rim and an outer rim, the inner rim of said collar member being of smaller diameter than the inner rim of said plate member and the outer rim of said collar member terminating in a thrust bearing surface against the channel of said plate member, means for supplying oil to the channel of said plate member, means for retaining oil in said channel, a shaft secured to the inside of said collar member whereby to rotate the same, oil grooves in the bearing surface of said collar diverging from true radii in the direction of rotation of said collar, means on said shaft transferring thrust to said collar member, a support, a bushing through said support, said shaft passing through and being journalled in said bushing, resilient means separating said plate member and said support whereby said bearing is self-aligning, and a bearing lining between said shaft and said bushing, said lining extending between said resilient means and said shaft.

5. In a thrust bearing assembly, a rotating shaft, a shaft-guiding bushing through which said shaft passes, an annular bearing plate of channel section having an inner rim and an outer rim, resilient means positioned between and serving to separate said bushing and said plate, said means serving to carry thrust from said plate and automatically to align said bearing, an annular bearing collar of channel section inverted with respect to the channel section of said plate and having an inner rim and an outer rim, the inner rim of said collar engaging said shaft and the outer rim of said collar terminating in a thrust bearing surface against said plate, approximately radial oil grooves in the bearing surface of said collar serving to force oil from the outside to the inside of said bearing surface of the outer rim of said collar due to rotation of said surface, a bearing lining between said shaft and said bushing, said lining extending along said shaft toward the inner rim of said collar and terminating short thereof to form a space around said shaft through which oil may flow to the channel of said bearing plate, means for supplying oil to said space, and means for retaining oil in the channel of said bearing plate.

6. In a thrust bearing assembly, a rotating shaft, a shaft-guiding bushing through which said shaft passes, an annular bearing plate of channel section having an inner rim and an outer rim concentric with said shaft, resilient means supporting said plate on said bushing and serving to carry thrust from said plate and automatically to align said bearing, an annular bearing collar having an outer rim concentric with said shaft and an inner rim concentric with and secured to said shaft, the outer rim of said collar terminating in a thrust bearing surface against the inside of the channel of said plate, oil grooves in said surface diverging from true radii in the direction of rotation of said surface, a shoulder on said shaft in contact with and transmitting thrust to the inner rim of said collar, a cylindrical portion extending from said bushing along said shaft toward said inner rim and terminating short thereof to form a space around said shaft through which oil may flow to the channel in said bearing plate, an oil hole in said shaft communicating with said space, and means for retaining oil in the channel of said plate.

7. In a thrust bearing assembly according to claim 6, a conical face at the end portion of said shaft adapted to frictionally engage a turntable, said face terminating on one end in said shoulder, and a record-centering pin at the other end of said face and at the center of said shaft, said oil hole comprising a hole through said shaft interconnecting the end of said pin and said space, respectively.

ISAAC PEACE RODMAN.